United States Patent [19]

Wood

[11] Patent Number: 6,023,263
[45] Date of Patent: Feb. 8, 2000

[54] STEREOSCOPIC IMAGE DISPLAY DRIVER APPARATUS

[75] Inventor: Karl J. Wood, Crawley, United Kingdom

[73] Assignee: U.S. Philips Corporation, New York, N.Y.

[21] Appl. No.: 08/869,912

[22] Filed: Jun. 5, 1997

[30] Foreign Application Priority Data

Jun. 7, 1996 [GB] United Kingdom .................... 9611939

[51] Int. Cl.⁷ ...................................................... G09G 5/36
[52] U.S. Cl. ............................................ 345/139; 345/425
[58] Field of Search .................................... 345/425, 422, 345/430, 139, 419; 395/122, 130; 378/42; 348/42, 51, 59

[56] References Cited

U.S. PATENT DOCUMENTS

| | | | |
|---|---|---|---|
| 5,073,914 | 12/1991 | Asahina et al. | 378/42 |
| 5,377,313 | 12/1994 | Scheibl | 395/122 |
| 5,495,563 | 2/1996 | Winser | 395/130 |
| 5,543,965 | 8/1996 | Bielinski et al. | 359/463 |
| 5,825,363 | 10/1998 | Anderson | 345/422 |

FOREIGN PATENT DOCUMENTS

| | | | |
|---|---|---|---|
| 0354851 A2 | 2/1990 | European Pat. Off. | H04N 13/04 |
| 0438195 A2 | 7/1991 | European Pat. Off. | G06F 15/72 |
| 0625861 A2 | 11/1994 | European Pat. Off. | H04N 13/04 |
| 0721131 A2 | 7/1996 | European Pat. Off. | G02B 27/22 |
| 0726482 A2 | 8/1996 | European Pat. Off. | G02B 27/22 |
| WO9518424 | 7/1995 | WIPO | G06T 15/00 |
| 9605573 A1 | 2/1996 | WIPO | G06T 2/00 |

OTHER PUBLICATIONS

"Multi view 3D–LCD" Cees van Berkel, presented as IS&T/SPIE International Conference on Electronic Imaging, Jan. 27, 1996.

"Computer Graphics: Principles and Practice" Foley et al, ISBN 0–201–12110–7 pp. 668–672, 1987.

"3D Displays for Videotelephone Applications" D Sheat et al, Eurodisplay 1993, pp. 411–413.

"Survey of Texture Mapping" Paul S. Heckbert, IIII CG&A Nov. 198 pp. 56–67.

"Pyramidal Parametrics" Lance Williams, Computer Graphics, vol. 17, No. 3 (Jul. 1983) pp. 1–11.

"Summed–Area Tables for Texture Mapping" F C Crow, Computer Graphics, vol. 18, No. 3 (Jul. 1984), pp. 2097–212.

*Primary Examiner*—Regina Liang
*Attorney, Agent, or Firm*—Gregory L. Thorne

[57] ABSTRACT

A hybrid driving arrangement of multiple 3D graphics renderers and multiple synthetic stereo processors is provided for driving multiple view displays such as four view display devices. The device is an LCD screen device with an overlying lenticular screen, with the arrangement of pixels driven from the four different sources relative to the individual lenticular arrays being such that, at viewing locations V1 to V4, the images from respective ones of the four sources (76–79) can be seen. As the main viewer of such a multiple view display will typically be positioned in the center of the display as shown, and as such will only see a stereoscopic image provided by the two central views V2 and V3, the image sources for the two center views V2,V3 are respective 3-D graphics renderers, and those for the other views, post-processing stages. Thus the main viewer has the best quality view while viewers to the side suffer some (acceptable) degradation.

6 Claims, 4 Drawing Sheets

STEREOSCOPIC IMAGE DISPLAY DRIVER APPARATUS

BACKGROUND OF THE INVENTION

1. Field of the Invention

The present invention relates to apparatuses for driving autostereoscopic displays, such displays comprising an array of display pixels arranged in rows and columns, and an array of elongate lenticular elements extending parallel to one another overlying the display pixel array and through which the display pixels are viewed.

2. Description of the Related Art

An example of such an autostereoscopic display device is described in European Patent application EP-A-0 625 861 where a spatial light modulator of the LCD type has a number of picture elements arranged as rows extending horizontally and columns extending vertically. Overlaying the spatial light monitor is a lenticular screen with the radius of the lenticules being selected in combination with the positioning of the screen relative to the picture elements such that the image due to differing groups of picture elements becomes visible at certain predetermined angles relative to the display screen. Where there are two images in the form of a stereoscopic pair being displayed, the viewer need only position themself such that the left and right eye receive the image from the different picture element groups to perceive a three-dimensional image.

It is accepted that driving the two channels of a stereoscopic display from two 3D graphics renderers, one per eye viewpoint, is in principle better than attempting to synthesise two images using one 3D graphics renderer. Advantages are as regards image quality and in potential for avoiding fatigue and nausea related side effects: the problem, however, is cost—particularly where more than two views are considered. The Philips 3D LCD, as described in a paper entitled "Multiview 3D-LCD" by Cees van Berkel et al presented at IS&T/SPIE International Conference on Electronic Imaging, San Jose Jan. 27 to Feb. 2, 1996, is currently available as a four view device. In a traditional implementation, four views require four 3-D graphics renderers if quality is important.

SUMMARY OF THE INVENTION

It is therefore an object of the present invention to provide a multiple view display device having reduced overheads in terms of the cost of rendering per view.

In accordance with the present invention there is provided an autostereoscopic display apparatus comprising N image sources coupled with a matrix display panel having an array of display elements which are arranged so as to extend in rows and columns in a row and column direction respectively and in groups with each group comprising N adjacent display elements in the row direction, with each of said N display elements being driven by a respective one of said N image sources, where N is a number greater than two, and optical director means comprising a plurality of optical director elements each of which is associated with a respective group of display elements for directing the outputs of the display elements in mutually different angular directions, characterised in that each of at least two of the N image sources comprises an image rendering apparatus having a host processor with associated main memory for the storage of object primitive data, and a first display processor with associated display memory, the host processor comprising means for supplying object primitive data to the first display processor, and the first display processor comprising means for generating from the object primitive data a series of pixel values and pixel addresses for application to the display memory; and in that at least one of the N image sources comprises a post-processing stage coupled with one of the said image rendering apparatuses and arranged to apply a horizontal shift to pixel values of images generated thereby.

Where there are an even number of elements, the central adjacent pair of display elements are suitably driven by respective image rendering apparatuses with the remainder being driven by post-processing stages. As it is expected that the main viewer of such a multiple view display will be positioned in the center of the display, typically being involved in some interactive role, that viewer will see the two central views only. Other viewers, typically in some passive role, may be positioned off center. By having the two center views being driven from two 3D graphics renderers, and the other views driven from views created using synthetic stereo, the invention provides an optimum combination of quality and cost in which the main viewer has the best seat while viewers to the side suffer some degradation whilst still obtaining a 3D view.

The post-processing stages outward of a first post-processing stage may suitably be configured to generate their respective pixel values by applying the horizontal shift to pixel values generated by the adjacent post-processing stage toward the center. In other words, each stage generates its image on the basis of that generated by the adjacent stage. Alternatively, all of the post processing stages might be configured to generate images from the original rendered pair, although for a large number of views, the size of offset to be applied may cause problems.

BRIEF DESCRIPTION OF THE DRAWINGS

Further features and advantages of the present invention are defined in the attached claims, to which reference should now be made, and will become apparent from reading of the following description of preferred embodiments of the present invention, given by way of example only, and with reference to the accompanying drawings, in which:

DESCRIPTION OF THE PREFERRED EMBODIMENT

Figure 1:
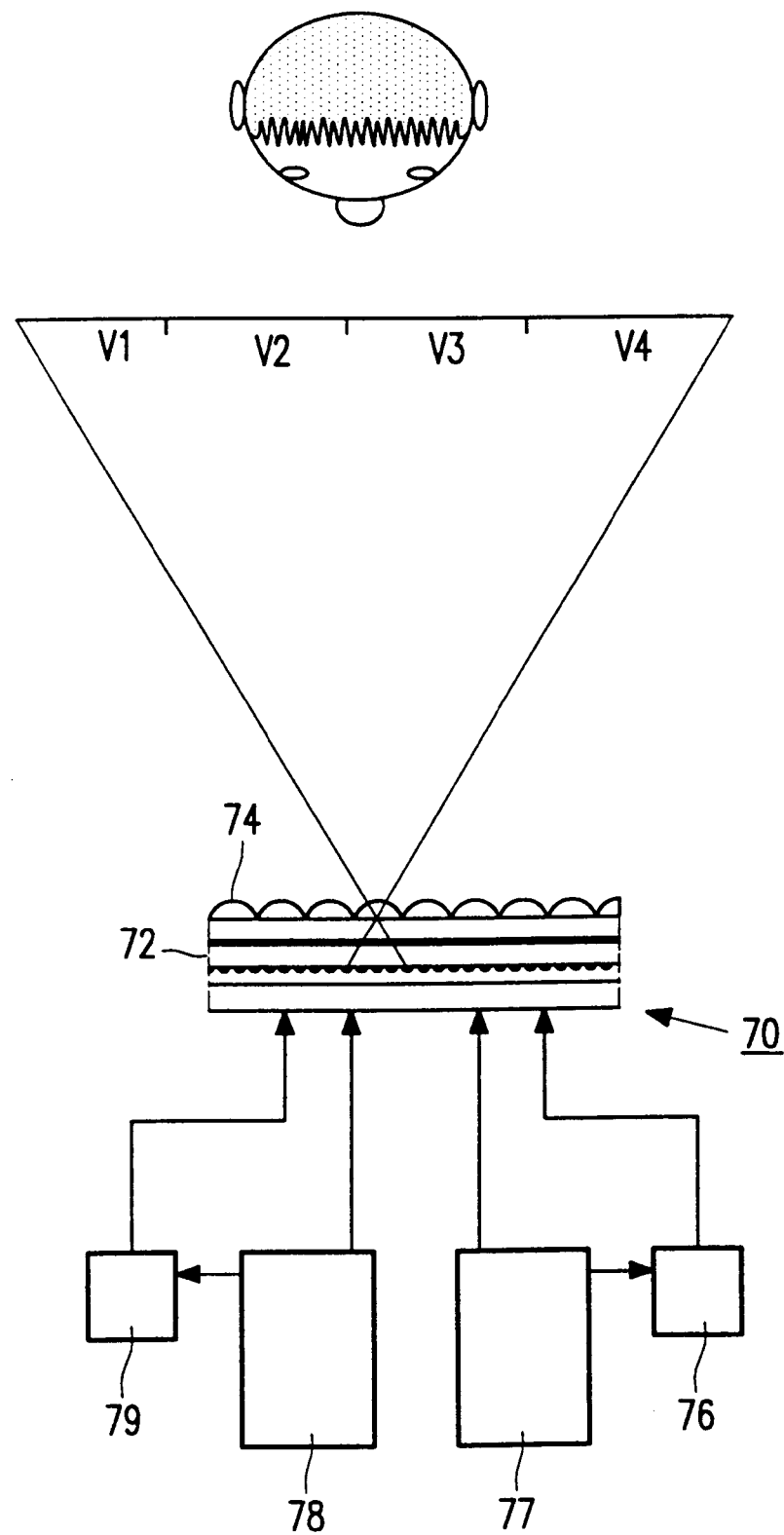
FIG. 1 illustrates a multiple view display device arrangement embodying the present invention.

A stereoscopic application embodying the present invention is shown in FIG. 1, where a four view display device 70 is provided: the device is an LCD screen device 72 with an overlying lenticular screen 74, with the arrangement of pixels driven from four different sources 76–79 relative to the individual lenticular arrays being such that, at viewing locations V1 to V4, the images from respective ones of the four sources 76–79 can be seen. A four view display of this type is described in the above-referenced paper entitled "Multiview 3D-LCD" by Cees van Berkel et al.

It is expected that the main viewer of such a multiple view display will be positioned in the center of the display as shown, typically being involved in some interactive role, and as such will only see a stereoscopic image provided by the two central views V2 and V3. Other viewers, typically in some passive role, may be positioned off center. To provide an optimum combination of quality and cost, the image sources 77,78 for the two center views V2,V3 are respective 3-D graphics renderers, and the other views, image sources 76,79 are merely post-processing stages coupled to respective ones of the renderers 77,78 and generating views by synthetic stereo, as will be described hereinafter. Thus the main viewer has the best quality view while viewers to the side suffer some degradation. Where more than four views are supported by the display, the arrangement may be extended with a hybrid of multiple 3-D graphics renderers and multiple synthetic stereo processors such as to provide multiple view display in a cost effective but high quality manner, and such that higher quality is available towards the central viewing position, or at predetermined principal viewing positions.

As will become apparent from the following, the present invention may make use of both conventional and screen space 3-D graphics renderers. A conventional renderer is one in which rendering primitives (typically triangles) are written sequentially to a frame buffer and, as such, any pixel of the final image may be written at any time. A screen space renderer splits the screen into smaller areas of M×N pixels called tiles; this includes so-called scanline renderers where M is the width of the screen and N is 1 pixel. For each tile the screen space renderer determines which primitives contribute to (are overlapped by) that tile, performs rendering processes such as texturing, and writes pixel values for that tile to the frame buffer.

A conventional or screen space renderer can perform depth sorting for rendering primitives in each screen or tile using conventional z-buffer methods as described for example in "Computer Graphics: Principles & Practice" by James D. Foley et al, 2nd Edition, published by Addison-Wesley 1990, ISBN 0-201-12110-7, at pages 668 to 672. The z-buffer algorithm is used to deduce the nearest visible rendering primitive at each pixel and hence the color of the pixel to be output. The screen space renderer need only maintain a z-buffer for each tile, whereas a conventional renderer must maintain a z-buffer for the screen.

The rendering technique to be described is equally applicable to both conventional and screen space renderers, but it is more appropriate to screen space renderers because of their smaller z-buffer requirements. Neither is the technique restricted to renderers using the conventional z-buffer; it is applicable to those renderers that accumulate some or all of the rendering primitives impacting each pixel in order that attributes of these rendering primitives can be combined (in some manner) to determine the final pixel color and depth; this composite can be considered as the nearest opaque pixel information in subsequent discussions.

Figure 2:
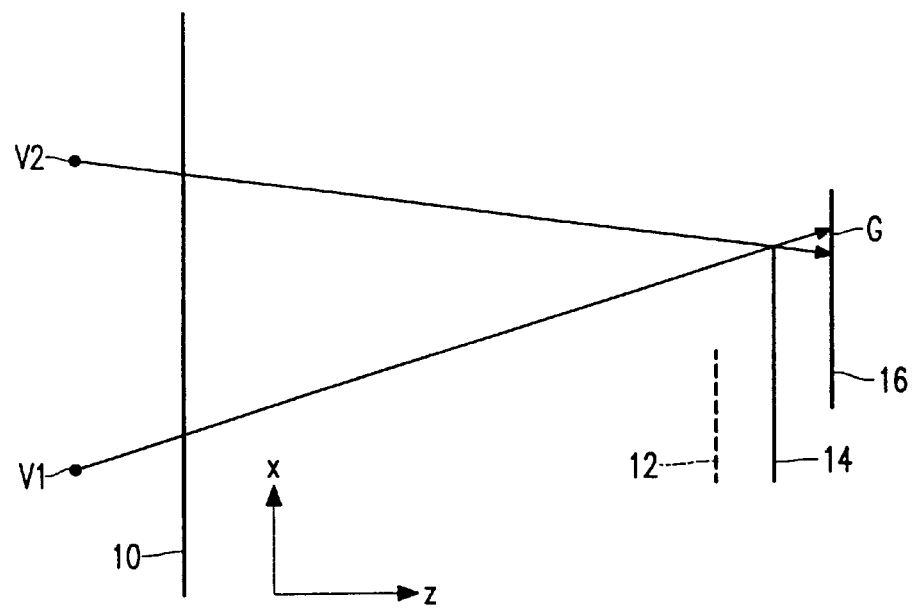
FIG. 2 is a plan schematic view illustrating parallax shift effects between two horizontally spaced viewpoints.

FIG. 2 is a plan view showing the parallax effect leading to the appearance of gaps in conventional techniques for a pair of viewing positions V1 and V2 which may suitably comprise a stereo pair. The screen on which the viewer sees the 2-D transformed version of the 3-D virtual environment is indicated at 10, with the area to the right of this representing apparent depth within the image field (the z-direction). Three image primitives are represented at 12, 14 and 16: for simplicity of illustration, it is assumed that all three are parallel and vertical planar bodies. The primitive 12 with the smallest depth value z (hence the closest to the viewer) is assumed to be translucent whilst the two further back primitives 14, 16 are each assumed to be opaque.

Figure 3:
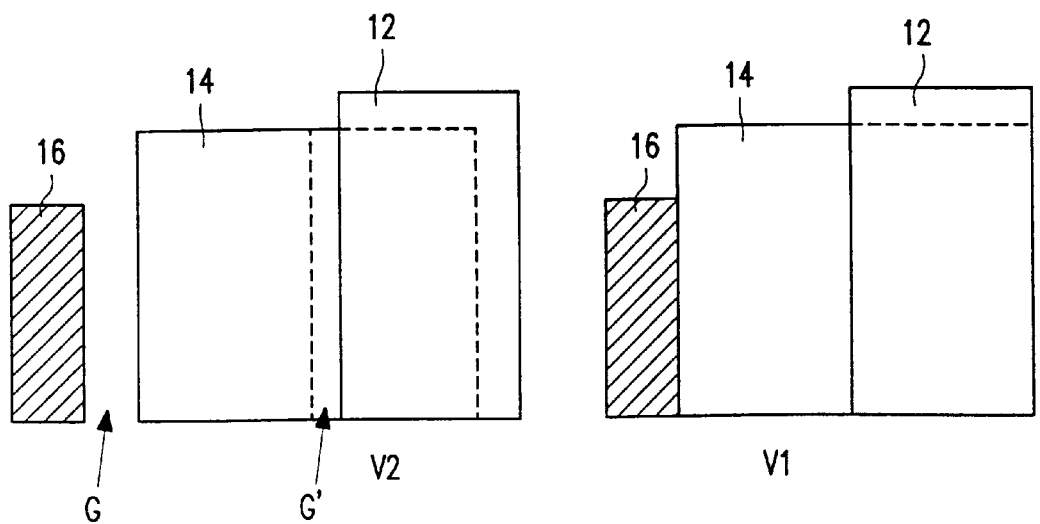
FIG. 3 shows three overlapping image primitives as seen from each of the viewpoints of FIG. 2.

The view of the three primitives from the respective viewpoints V1 and V2 is shown in FIG. 3. The images illustrate the problem where the image for the right eye (V1) is rendered complete and that for the left eye generated by post-processing, with a gap G appearing in the V2 image where the shift in the x-direction has uncovered an area of the primitive 16 for which, during z-buffering of the V1 image data, the data was discarded as obscured by the opaque surface of primitive 14. A further potential gap area is indicated at G' which is revealed by the parallax shift to the translucent primitive 12: whether or not a gap appears will depend on whether a compound value for the color due to both primitives is held or whether the data for the two primitives 12 and 14 is separately stored for the G' area. Typically a renderer will maintain the depth of the nearest opaque primitive, although screen space renderers in particular might maintain related information such as the depths of translucent or partially covered primitives in front of the aforementioned opaque primitive. Renderers typically discard primitives such as 16 behind the nearest opaque primitive 14.

In order to overcome this defect, stereo image generating apparatus for use as renderers 78 and 79 in the FIG. 1 arrangement maintains information about the primitive that is immediately behind the nearest opaque primitive for each pixel; this is referred to hereinafter as the nearest occluded pixel information. In effect a z-buffer is maintained for not only the nearest visible pixels but also for the nearest occluded pixels. Consequently, when pixels corresponding to the nearest opaque pixels are shifted to the left or right during generation of the synthetic stereo images (for example, the left hand edge of primitive 14), the nearest occluded pixel information (for the previously hidden part of primitive 16) is available to fill in the gaps caused by shifting. The nearest occluded pixel information typically corresponds to the actual scene content, so the filled gaps are highly correlated to the remainder of the image and as such are unobtrusive.

Maintaining the occluded pixels is expensive (but not prohibitive) for a conventional renderer because it must in effect maintain two full screen z-buffers and two full screen frame buffers for each frame. A screen space renderer may already be maintaining depth information for several rendering primitives per pixel, making maintenance of the nearest occluded pixel relatively inexpensive. The two sets of depth and color information for each pixel need only be held for the pixels in a given tile, which is considerably less expensive than the cost of maintaining two such sets for every pixel on the screen.

In terms of maintaining throughput for real time operation, a conventional renderer must necessarily texture and illuminate the occluded pixels so there is no loss in throughput there, but the z-buffer depth sorting done at the frame buffer writing stage must be done twice as fast as normal. A screen space renderer typically does depth sorting before texturing and illumination, so it must double its throughput during and after depth sorting, however it still need not texture or illuminate otherwise occluded pixels.

Figure 4:
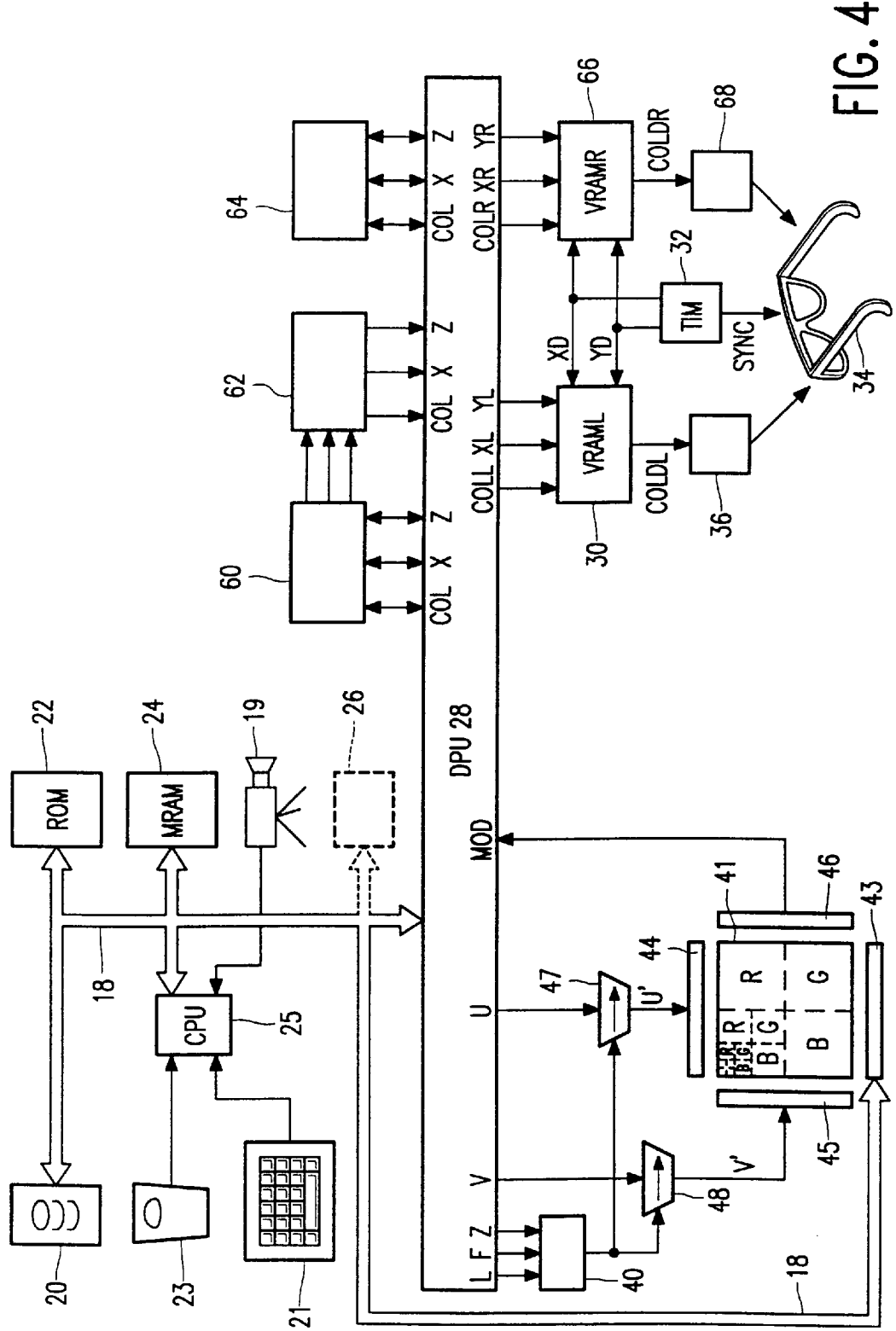
FIG. 4 is a block diagram of a stereoscopic display apparatus, including image rendering and texture mapping hardware, suitable for use with the present invention.

FIG. 4 is a block diagram of a scanline-type of stereoscopic rendering and display apparatus. A keyboard 21 and a trackball input device 23 provide input from a user to a central processing unit (CPU) 25, other input devices may also be used, of course, such as a joystick, digitising tablet, or a mouse. Objects and also photographic images to be applied to object surfaces by texture mapping may also be input from a video source such as a camera 19.

The CPU 25 is connected via a bus 18 to a disc store 20, a ROM 22 and a main memory (MRAM) 24. The disc store, which may include magnetic floppy discs, hard discs, and/or optical memory discs, is used for storing data (for example images or 3-D model data) which can then be recalled and manipulated to generate new images as desired. Such data may include the user's work from previous input sessions and/or commercially generated data, for example for use in interactive computer-aided design or computer simulations for education or entertainment. To allow modelling of 3-D objects, such data will generally be stored as polygonal model data rather than in the form of two-dimensional images. In that case, the data corresponds to a 3-D model containing objects which are typically broken down into groups of polygonal surfaces (primitives) in 3-D object space. The data for each object in the model comprises a list giving the position and nature of every polygon that goes to make up the object, including the relative positions of its vertices and the color or transparency of the polygon surface. In other systems, primitives may comprise curved surface patches, as is known in the art. It is known that a texture can be specified for mapping onto the surface, so that detail can be represented without increasing the number of primitives that make up the scene. A texture map is a stored 2-D array of texture element (texel) values defining a 2-D pattern of modulation that may for example define the color of pixels (in a manner described below), or may modulate other quantities such as reflectance or surface normal direction. These texture maps may also be stored in the disc store 20 and recalled as required.

The CPU 25 and the other components of the system then translate the 3-D model "world" in object space into a first two-dimensional view for the user (in "viewer" space), from a first viewpoint which may be determined by the application or may be controlled by a user. As will be described below, the second view is generated by post-processing, with the first and second views forming a stereo pair for display on an autostereoscopic display screen (as in FIG. 1) or a VR-type head-mounted display (HMD) 34.

The translation is effected by means of geometric transformations effecting translations, rotations and perspective projections, generally by means of matrix multiplication of vertex coordinates, and the CPU 25 may also perform clipping and lighting calculations on a per-primitive or per-vertex basis. The ROM 22 and MRAM 24 provide program memory and workspace for the CPU 25, and special processing hardware 26 may be provided to assist the CPU 25 to perform the large number of arithmetic operations required to convert all but the simplest models into a two-dimensional scene. The hardware 26 may comprise standard arithmetic circuits or it may include more powerful custom-built or programmable digital signal processing integrated circuit, and may be connected to the CPU 25 via bus 18. The nature of the hardware 26 will depend on the requirements of the system, for example with respect to speed, resolution, number of primitives per scene, etc.

A display processing unit (DPU) 28 is connected between outputs of the CPU 25 (via the bus 18) and inputs of a first display memory (VRAML) 30 for the left hand image of the pair. The display memory 30 stores pixel data COLL in raster-scan format. The pixel data COLL might typically include for each pixel three 8-bit values (total 24 bits) corresponding to red (R) green (G) and blue (B) components of the desired image. Those skilled in the art will appreciate that in other embodiments fewer or more bits may be provided for, or the bits might define the color in terms of different components (e.g YUV).

In the DPU 28 the primitives are "scan converted" so that the final left hand image may be drawn a line at a time into the left hand display memory 30. Scan conversion is a process whereby the pixels covered by each primitive are written row by row and pixel by pixel, in the same way that the complete image will be scanned for output to the display.

The DPU 28 is coupled to first 60, second 62 and third 64 scanline buffers, with the first 60 performing hidden surface removal based on the relative z-value of each primitive contributing to a pixel. As a primitive pixel is "covered", which is to say an opaque pixel having a smaller depth is written into its place in the first buffer 60, the displaced primitive pixel is copied to the corresponding position in the second buffer 62. When all primitives corresponding to that scanline have been considered, the pixel values in buffer 60 are simply read out to the corresponding line in VRAML 30. The pixel values in buffer 62 represent the value for the first occluded primitive at each pixel location.

To generate the right hand image of the pair, a shift in the x direction is applied to pixel values in buffers 60 and 62 in an amount determined by the respective depth values of the individual pixels and these values are then entered in the buffer 64 at the new locations. As before, a value can only be entered if there is not already a nearer opaque pixel at that location so that majority of values from buffer 62 will be rejected in favour of those from buffer 60 but, where the parallax shift has introduced a gap (as in FIG. 3) the necessary pixel values for the first occluded primitive will generally be present from buffer 62.

When all values have been written into buffer 64, the resulting contents comprise the correct pixel values for the corresponding line in the shifted right hand image and the data is written directly to a second display memory 66 (VRAMR).

A timing unit (video controller) 32 generates read-address signals XD and YD to address the pixel data within the two display memories VRAML 30 and VRAMR 66 synchronously with the raster-scanning of respective display screens in HMD 34. In response to these address signals, the locations in VRAML 30 and VRAMR 66 are scanned row by row and column by column to read respective color values COLDL and COLDR which are fed to display converters 36, 68 which translate the pixel data COLDL and COLDR into the appropriate form of signal for supply to the HMD 34, which also receives timing signals (SYNC) from the timing unit 32. As will be readily understood, the form and/or operation of components 30,32,36,66,68 may vary for different display devices, for example the autostereoscopic display of FIG. 1.

The pixel values COL are generated so that a basic surface color of the primitive is modulated to account realistically for attributes of an object's surface (for example transparency, diffuse reflectance, specular reflectance) and of the 3-D environment (for example locations and shapes of light sources). Some of this modulation can be generated arithmetically from parameters loaded with the primitive data, for example to produce smoothly varying shading to simulate a curved surface. However, to provide more detailed modulation, and to facilitate the introduction of depth cueing to the image, mapping hardware is provided to supply modulation values MOD based on a predetermined pattern stored in advance in a texture memory 41.

To this end, the DPU 28 generates a pair of texture coordinates U and V for each pair of pixel (display) coordinates X and Y so that the modulation pattern is mapped onto the primitive surface, implementing geometric transformations (i) from texture space into object space and (ii) from object space into viewer (display) space. Note that the texturing is done after sorting by the z buffers 60,62 to avoid the waste of rendering primitive areas which are definitely occluded.

The texture coordinates U and V are processed within the mapping hardware in a manner to be described below and applied to the texture memory 41 so that a modulation value MOD is available for each display pixel location X,Y being addressed. Commonly, even if the values MOD are color values, they will require to be modified within the DPU 28 to allow for realistic lighting effects. In a more general case, the modulation values MOD are used within the DPU 28 together with other parameters to modify the pixel values COLL and COLR less directly.

The texels represented in the texture memory 41 will not in general correspond on a one-to-one basis with the pixels of the display and, in particular when the primitive is shown in the distance and the texture is consequently mapped onto a very small number of pixels, two-dimensional spatial filtering is required to avoid the aliasing effects that would occur if simple sub-sampling were used.

It is known that a generalised filter cannot be applied economically in an apparatus where real-time moving images are to be synthesised, and the conventional solution to this is to store several 2-D arrays (hereinafter referred to as "maps") for a given pattern, each being successively smaller and pre-filtered to a successively lower resolution. The DPU 28 then need only produce a level coordinate L to determine the appropriate map to use. For compact storage and for high speed access to the texel values, the maps may be chosen to be square, having power-of-two dimensions, and be stored in a square texture memory according to the so-called "multum in parvo" ("MIP map") technique.

FIG. 4 shows within the texture memory 41 the color components R, G and B of a texture pyramid stored as a MIP map. The largest (highest resolution) map (L=0) may for example comprise 512×512 texels, the L=1 maps comprise 256×256 texels and so on down to L=9 where each map becomes a single texel. Assuming, for the sake of example, that each texel value comprises an 8-bit value for each of the R, G and B color components, the entire texture memory 41 is thus 1 Mbyte in size.

The texel values are stored in the memory 41 in advance of rendering by the CPU 25 via the bus 18 and a writing port 43 of the memory 41. For each texel value to be read, the DPU 28 generates a 2-D coordinate pair, each coordinate (U and V) of which includes at least an integer part 9 bits in length. At the same time, the level coordinate L is generated by the DPU 28 and, subject to modification by a depth cue circuit 40, is used to generate physical coordinates U' and V' from the "virtual" coordinates U and V for application to read address ports 44 and 45 respectively of the texture memory 41. In response to each physical coordinate pair U', V', the memory 41 releases the R, G and B components of an addressed texel via a (24-bit) read port 46.

Because of the two-dimensional binary tree arrangement of the MIP maps in the memory 41, the required physical coordinates U' and V' can be generated simply by a pair of binary shifting circuits 47 and 48 respectively, each right-shifting the respective coordinate a number of places defined by the level coordinate L. In particular, if L=0 represents the highest level, then the address corresponding to a given texel in the level 0 map can be converted to the physical address of the corresponding texel in the level L map can be found by right-shifting the U and V coordinates L places, effectively scaling-down each coordinate by 2L. The unmodified level coordinate L can be supplied to the DPU 28 as part of the primitive data, but if perspective is to be accounted for in the mapping, then the level coordinate L will more probably be generated within the DPU on a per-pixel basis, dependent on the partial derivatives of U,V with respect to X,Y.

Figure 5:
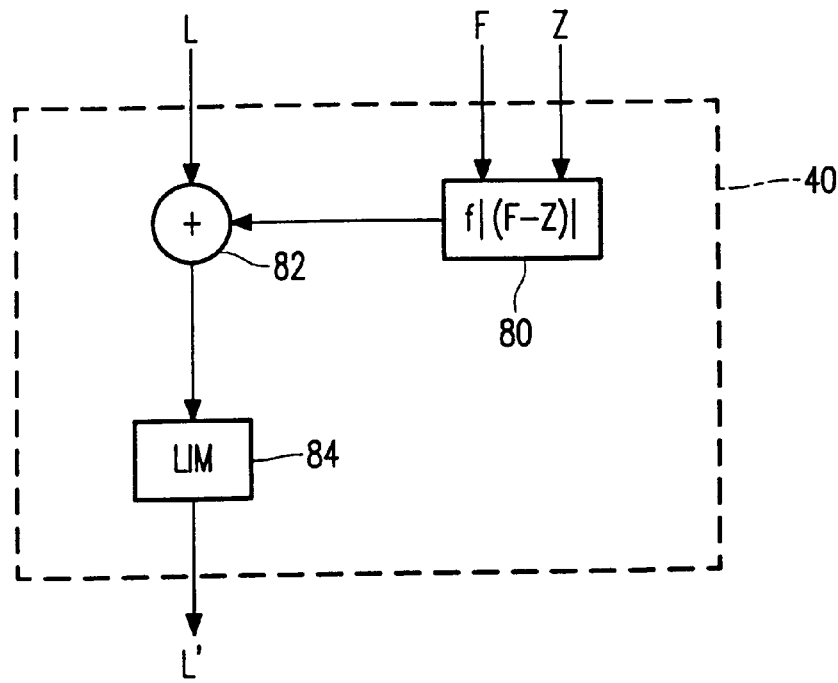
FIG. 5 schematically illustrates the depth cue circuit arrangement of the mapping hardware of FIG. 4.

The depth cue circuit 40 is shown in FIG. 4 as a separate unit coupled to the DPU 28 although, as will become apparent, its functions may equally be performed in software within the DPU. As shown schematically in FIG. 5, the circuit 40 has inputs for the unmodified level coordinate L, a focus depth F and a pixel depth z. The focus depth F specifies that apparent depth within the 2-D display image at which the viewer is intended to focus. The value of F may be fixed, or may be variable under control of the application or in response to user input, as required by the particular application. The pixel depth is supplied for each pixel in the displayed image, in synchronism with the generated display coordinates X and Y and is generated by the DPU 28 during the translation of the 3-D world model to the 2-D display image.

Figure 6:
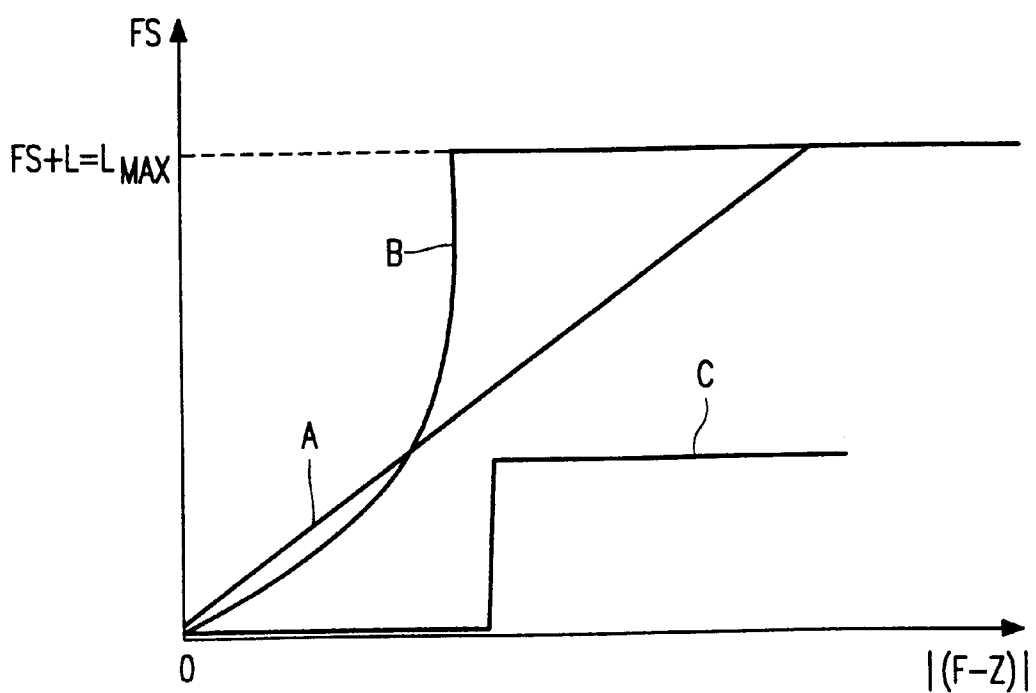
FIG. 6 represents different depth cueing characteristics which may be applied by the circuit of FIG. 5.

An arithmetic stage 80 generates an output value FS as a function of the separation between the pixel depth and focus depth which value is added to the unmodified level coordinate L at summation circuit 82 to produce a modified coordinate level L'. A limiter stage 84 is suitably provided on the output of the summation circuit to ensure that the modified coordinate L' is within the range of levels supported by the texture memory 41. The particular function applied by arithmetic circuit 80 may vary depending on the desired depth cue characteristic, as shown by examples A, B and C in the graph of FS against separation (F-z) in FIG. 6. The common feature is that for pixel depths at or close to the focus depth F the value of FS is zero such that L'=L and those pixels have the "appropriate" texture resolution whilst the texture is blurred at other depths.

Where the mapping hardware includes interpolators (not shown) for generating texture values by interpolating between two map levels of the pyramidal data structure, non-integer values of L' may be allowed, as shown by examples A and B (which also show the effect of the limiter stage 84 when the maximum value of L for the texture memory is reached). Where only integer values of L (and hence L') are supported, FS is similarly constrained to be an integer value as shown by example C.

From reading the present disclosure, other modifications will be apparent to persons skilled in the art. Such modifications may involve other features which are already known in the field of autostereoscopic display apparatus and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. An autostereoscopic display apparatus comprising N image sources coupled with a matrix display panel having an array of display elements which are arranged so as to extend in rows and columns in a row and column direction respectively and in groups with each group comprising N adjacent display elements in the row direction, with each of said N display elements being driven by a respective one of said N image sources, where N is a number greater than two, and optical director means comprising a plurality of optical director elements each of which is associated with a respective group of display elements for directing the outputs of the display elements in mutually different angular directions, characterised in that each of at least two of the N image sources comprises an image rendering apparatus having a host processor with associated main memory for the storage of object primitive data and a first display processor with associated display memory, the host processor comprising means for supplying object primitive data to the first display processor, and the first display processor comprising means for generating from the object primitive data a series of pixel values and pixel addresses for application to the display memory; and in that at least one of the N image sources comprises a post-processing stage coupled with one of the said image rendering apparatuses and arranged to apply a horizontal shift to pixel values of images generated thereby.

2. An apparatus as claimed in claim 1, wherein $N=2(M+1)$ and $M=(1,2,3 \ldots$ etc), and wherein the central adjacent pair of display elements are driven by respective image rendering apparatuses and the remainder are driven by post-processing stages.

3. An apparatus as claimed in claim 2, where post-processing stages outward of a first post-processing stage generate their respective pixel values by applying a horizontal shift to pixel values generated by the adjacent post-processing stage toward the center.

4. An apparatus as claimed in claim 1, wherein the display processor of an image rendering apparatus comprises a first z-buffer arranged to sort the primitive data to select the nearest opaque primitive per pixel of the first 2-D image, write the selected pixel data to the associated display memory, and output rejected pixel primitive data having a greater depth;

and a post-processing stage connected thereto comprises:

a second z-buffer coupled to receive the output rejected pixel primitive data from the first z-buffer and configured to select the nearest opaque primitive per pixel from the received data;

positional offset means arranged to apply a positional offset in one of said two dimensions to the coordinates of pixel primitive data selected in the first and second z-buffers in an amount per pixel determined by the respective depth value of that pixel; and a third z-buffer coupled to receive the shifted pixel primitive data from the positional offset means to select preferential contributions per pixel, and write the selected pixel data to a second display memory.

5. An apparatus as claimed in claim 4, wherein for an image rendering apparatus said host processor associated main memory further holds object primitive texture definitions and the display processor includes a texture memory;

the host processor further comprising means for storing in the texture memory at least one pyramidal or part-pyramidal array of texel values comprising a plurality of two-dimensional (2-D) arrays of texel values representing a given 2-D modulation pattern at at least two levels of resolution defined by respective values of a level coordinate; and said means for supplying object primitive data to the first display processor, including an indication that a pattern of modulation is to be applied to the object primitive in accordance with texel values stored in the pyramidal array in the texture memory; and the display processor further comprising means for generating from the object primitive data a series of pixel addresses for application to at least the first display memory and a corresponding series of 2-D texture coordinate pairs each with an associated level coordinate, to effect a mapping of the stored modulation pattern onto the object primitive at a level or levels of resolution defined by the associated level coordinate; means operable to generate an offset to each said associated level coordinate, and to generate said texture memory addresses from the received coordinate pair and the sum of the associated level coordinate and generated offset thereto; and an input for receiving a focal depth value, and said means operable to generate said offsets is arranged to generate said offsets having a respective magnitude determined by the received focal depth value.

6. A display apparatus as claimed in claim 5, further comprising user operable input means coupled to said host processor, said host processor being arranged to generate and vary said focal depth value in dependence on signals from said input means and to output said focal depth value to the or each display processor.

* * * * *